United States Patent [19]

Beck et al.

[11] 4,192,930

[45] Mar. 11, 1980

[54] ESTERIFIED OLEFIN-MALEIC ANHYDRIDE COPOLYMERS

[75] Inventors: Heinz Beck, Düren; Karl H. Frassek, Langerwehe; Werner Holtvoigt, Lohne-Riessel; Ambar Mukerjee, Nideggen, all of Fed. Rep. of Germany

[73] Assignee: Akzona Incorporated, Asheville, N.C.

[21] Appl. No.: 915,859

[22] Filed: Jun. 15, 1978

[30] Foreign Application Priority Data

Jun. 16, 1977 [DE] Fed. Rep. of Germany ....... 2727329

[51] Int. Cl.² .................. C08L 33/04; C08L 33/20; C08L 55/02; C08L 69/00
[52] U.S. Cl. ................ 525/227; 260/23 R; 260/23 AR; 260/27 R; 260/28.5 R; 260/28.5 AV; 264/331; 525/207; 525/328; 525/384; 525/1; 525/5
[58] Field of Search ............. 526/15, 5, 1; 260/23 R, 260/23 AR, 27 R, 28.5 R, 28.5 AV, 857 UN, 876 R, 860, 899, 884, 878 R, 823, 851; 264/331

[56] References Cited

U.S. PATENT DOCUMENTS

| | | | |
|---|---|---|---|
| 2,483,959 | 10/1949 | Baer | 260/884 |
| 2,977,334 | 3/1961 | Zopf et al. | 526/15 |
| 3,051,562 | 8/1962 | Gee et al. | 526/15 |
| 3,435,093 | 3/1969 | Cope | 260/857 |
| 3,475,361 | 10/1969 | Garner | 260/884 |
| 3,530,101 | 9/1970 | Haynes et al. | 526/15 |
| 3,598,778 | 8/1971 | Burdick et al. | 526/15 |
| 3,645,939 | 2/1972 | Gaylord | 260/884 |
| 3,741,940 | 6/1973 | Heilman | 526/15 |
| 3,899,473 | 8/1975 | Johansson | 260/884 |
| 3,979,347 | 9/1976 | Brotz et al. | 260/28.5 D |
| 4,031,061 | 6/1977 | Thomas | 260/884 |
| 4,039,486 | 8/1977 | Mark | 260/876 R |

FOREIGN PATENT DOCUMENTS

| | | | |
|---|---|---|---|
| 746014 | 2/1970 | Belgium | 260/884 |
| 1190661 | 4/1965 | Fed. Rep. of Germany | 260/876 R |
| 2015162 | 10/1971 | Fed. Rep. of Germany | 260/862 |
| 943280 | 12/1963 | United Kingdom | 260/884 |
| 1383262 | 2/1975 | United Kingdom | 260/876 R |
| 1402917 | 8/1975 | United Kingdom | 526/15 |
| 1487503 | 10/1977 | United Kingdom | 526/15 |

*Primary Examiner*—John Kight, III
*Attorney, Agent, or Firm*—Jones, Tullar & Cooper

[57] ABSTRACT

This invention relates to moldable thermoplastic compositions comprising a thermoplastic polymer admixed with a minor shaping processing improving amount of an esterified olefin-maleic anhydride copolymers formed from olefins having 2 to about 24 carbon atoms, where the esterifying alcohol is a monovalent alcohol having 2 to about 20 carbon atoms and where the ratio of maleic anhydride to esterifying alcohol is about 1:0.5 to about 1:2.

18 Claims, No Drawings

ESTERIFIED OLEFIN-MALEIC ANHYDRIDE COPOLYMERS

BACKGROUND OF THE INVENTION

The use of various olefin-maleic anhydride copolymer derivatives as polymeric composition additives is known in the art. For example, Belgian Pat. No. 746,014 describes the modification of polyvinylchloride (PVC) to increase impact resistance by the addition of at least 0.1% by weight of a copolymer of an unsaturated acid anhydride with styrene, an olefin, or an alkylvinyl ether containing alkyl groups of 1 to 25 carbon atoms. Compositions containing 0.1 to 5% by weight of the copolymer are stable during roller milling for up to 15 minutes at temperatures between 149° and 204° C. without the addition of a special lubricant. However, a roller mill stability of 15 minutes is inadequate for processing.

U.S. Pat. No. 3,435,093 describes mixing polyethylene terephthalate with ionic copolymers of α-olefins with α,β-unsaturated carboxylic acids to provide compositions having improved impact resistance.

German patent application No. 2,015,162 describes injection moldable thermoplastic polyester molding compositions where the thermoplastic polyester particles are coated with a coating, comprising 0.01 to 5% by weight, based on weight the polyester, of an ionic copolymer of α-olefins and salts of α,β-unsaturated mono- or dicarboxylic acids containing ions of mono-, di- or trivalent metals. The resultant plastic material upon molding was easily removed from the mold, with the copolymers serving as mold release agents.

The olefin-maleic anhydride (or maleic acid) copolymers heretofore added to plastics prior to molding are unsuitable as lubricants, since the roller mill stability of the resultant compositions is inadequate to meet the requirements often encountered in the processing of plastics, even when the copolymers were added in amounts (up to 5% by weight) greater than customarily considered for lubricants.

In the plastics processing art, plastics are shaped at elevated temperatures, under compressive loads. In such a process, a portion of the heated plastic tends to adhere to parts of the molding apparatus. The adhering plastic has a longer dwell time in the apparatus, which results in thermal degradation of the plastic, which can result in the termination of an operating molding run. In the processing of PVC, and similar chlorine containing resins, since there is a time limit on the effectiveness of added stabilizers, thermal degradation further results in the generation of hydrochloric acid.

In order to prevent of diminish the difficulties related to thermal degradation of the plastics, in addition to the customary stabilizers, lubricants and/or processing aids are added to the plastic compositions prior to processing to facilitate gelation, to enhance the flow characteristics of the molten composition, and to prevent or retard the adherance of the plastic composition to the heated metal surfaces.

Two major classes of lubricants are known i.e. internal lubricants and external lubricants. Good internal lubricants are e.g. fatty alcohols, as well as fatty acid partial esters of of glycerin, such as glycerin monnoleate or glycerin monostearate. Among the external lubricants with good release effects are fatty acid amides, fatty acid esters, natural, as well as synthetic paraffin hydrocarbons, low-molecular weight polyethylene and hardened glycerides.

The selection, amount and combination of several types of lubricants depend upon the processing conditions, such as temperature, pressure and the characteristics of the components of the mixture. To date, processors of plastics, in order to meet the requirements of different processing methods, were forced to use combinations of different lubricants. The necessity of using special mixtures for special cases results in considerable expense for the processor. In addition, incompatibility phenomena, even if lubricant combinations are used, can not always be avoided, since it is necessary to maintain the required minimum quantities of lubricant addition to achieve adequate freedom from adhesion.

German published patent application No. 1,190,661 describes the use of esters of monovalent alcohols containing at least 10 carbon atoms and monobasic fatty acids containing at least 10 carbon atoms, optionally containing free hydroxyl groups, as lubricants in the manufacture of shaped thermoplastic articles. However, when using the described esters, relatively high quantities of lubricants have to be added in order to achieve an adequate lubricating effect.

Lubricants are described in British Pat. No. 943,280, which consist of a partial ester of a polyalcohol containing more than 3 carbon atoms and at least 3 hydroxyl groups in the molecule, and a monocarboxylic acid derived from an animal or vegetable oil or fat, or vegetable wax, which acid has more than 7 carbon atoms in the molecule. The partial ester must contain a free hydroxyl group in the molecule. These lubricants are used in proportions of 0.5 to 5% by weight, based to the weight of the plastic.

It is noted that, while the olefin-maleic anhydride copolymers are formed by copolymerizing an olefin with maleic anhydride, the result polymer is frequently termed a olefin-maleic acid copolymer.

DESCRIPTION OF THE INVENTION

The present invention is directed to novel olefin-maleic anhydride copolymer derivates that are excellent lubricants in plastic composition shaping processes, which need only be employed in relatively small quantities, and which regarding their effect as internal and external lubricants can be employed in amounts so as to eliminate or reduce the risks of incompatibility, which permitting the use of optional processing conditions.

The esterified olefin-maleic anhydride copolymers of the invention comprise copolymers of maleic anhydride and olefins containing from 2 to 24 carbon atoms, and preferably 8 to 24 carbon atoms which copolymers are esterified with monovalent alcohols containing 2 to 20 carbon atoms at a molar ratio of maleic anhydride to alcohol of about 1:0.5 to about 1:2. Preferably the molar ratio of maleic anhydride to alcohol is about 1:0.85 to about 1:2.0.

The olefin-maleic anhydride polymers which are esterified to form the polymers of the invention are well known and can be prepared for example by peroxide catalyzed copolymerization as described in the art. Preferably the unesterified copolymers have an average molecular weight between about 2000 and about 60,000 and preferably between 2000 and about 15,000.

Preferably the copolymers comprise the maleic anhydride and olefins in a molar ratio of about 0.8:1 to about 1.8:1. It has been found that lubricants with especially good heat stability are obtained from esterified copolymers formed from olefins containing 8 to 24 carbon atoms.

The olefins which can be employed to form the copolymer can be any monoolefin, copolymerizable with maleic anhydride, having 2 to 24 carbon atoms including ethylene, propylene, isobutylene, 2-ethylhexene-1, 1-decene etc. including commercially available olefin mixtures characterized by having an average or predominate olefin carbon number content, for example, a $C_{20}$ olefin sold by Gulf Oil Co. α-monoolefins are particularly suited to copolymerizable monomers.

The method of forming olefin-maleic anhydride copolymers, for example with the use of peroxide catalysts is well known in the art and therefor is not recited in detail here. See for example "Macromolecular Synthesis" Vol. 1, page 43, John Wiley, New York (1963) and the references therein.

The alcohols utilized to esterify the olefin maleic anhydride copolymers can be any $C_2$ to $C_{20}$ monovalent alcohol, preferably unsubstitutional, but if desired, substituted with any substituent which is non-reactive under the esterification conditions employed to form the copolymer esters. Preferably the alcohol is a primary or secondary alcohol, and is also preferably aliphatic. Examples of useful alcohols include ethanol, butanol, isobutanol, 2-ethylhexanol, isooctanol, decanol, fatty alcohols, such as tallow alcohol and the like.

The method for esterifying the copolymers is not unduly critical and is well known. For example, esterified maleinized oils are old in the art and the conditions employed in such esterification reactions are useful here. Generally the copolymer and alcohol are heated together for a time sufficient to obtain the desired degree of esterification. The first mole of alcohol reacts with unopened anhydride rings without elimination of water. The reaction of the alcohol with free carboxyl groups results in the elimination of water of reaction. Where low boiling alcohols are employed, a reflux system can be employed to remove any water of reaction. Where higher boiling relatively non-volatile alcohols are employed, passing an inert gas through the reaction mixture assists in the removal of water of reaction.

The esterified copolymers of the invention are useful as polymer processing lubricants when admixed in minor amounts with virtually any thermoplastic mold formable plastic, that is a polymer composition which at elevated temperatures can be shaped under compressive loads. The esterified copolymers are employed in minor shaping processing improving amounts generally between about 0.025 to about 1% by weight and preferably between about 0.05% to about 0.5% of the thermoplastic mold formable polymer.

In a preferred embodiment the esterified olefin-maleic anhydride copolymers of the invention are employed polymer lubricants as in admixture with one or more materials selected from the group of aliphatic hydrocarbons containing more than 12 carbon atoms, aromatic hydrocarbons, esters of fatty acids containing more than 7 carbon atoms, wax esters, wax alcohols, or fatty alcohols containing more than 7 carbon atoms. Preferably this lubricant mixture contains about 10 to about 90% by weight of the esterified olefin-maleic anhydride copolymer.

The lubricant compositions of the invention do not discolor the moldable polymer and do not diminish the stability of the moldable polymer. Further to the high effectiveness, relatively low quantities of the lubricants need by used, and therefor the mechanical characteristics of the shaped articles formed are improved, for example, the tensile strength and the Vicat value are improved over plastics processed with lubricants known in the art. In addition, even if the moldable polymer composition undergoes degradation, since there is reduced adhesion during processing, cleaning of the apparatus is accomplished with fewer problems.

The lubricants of the invention have good compatibility with vinyl resin liquid stabilizers which permits the use of the lubricant of this invention in preformed polymer processing additive mixtures containing stabilizers, lubricants and other auxiliary agents. Stabilizers suitable for such mixtures with the lubricants of the invention are neutral or basic metal soaps, basic lead salts, calcium, lead or zinc carboxylates or tin thioglycolate such as octyl or butyl tin thioglycolates as well as mixtures of two or more of usual stabilizers.

As previously stated the lubricants of the invention are useful with virtually any thermoplastic mold formable plastic, especially when employed as lubricants in injection or extrusion shaping processes. The preferred resins are the vinyl resins including polyvinyl chloride as well as vinyl chloride copolymers for example, with vinylacetate and vinylidene chloride. There are also useful for polyolefins such as polyethylene and polypropylene, polyvinylidene chloride copolymers with vinyl chloride or with acrylonitrile. Other mold formable plastics include polystyrene and copolymers of styrene with acrylonitrile or methyl methacrylate, polycarbonates, nylons such as nylon 6, nylon 6/6 nylon 6/10 or nylon 11, the acrylic family of plastics, the ABS family of plastics, and polyesters such as polyethyleneterephthalate. Attention is drawn to the "Handbook of Plastics and Elastomers" Harper, Ed. McGraw-Hill, New York, 1975 for details relating to thermoplastic mold formable plastics.

There follow a number of examples of copolymers and their use as polymer processing aids. These examples should be considered exemplary and not limiting. All parts and percentages in the examples as throughout the specification are by weight unless otherwise specified. All temperatures are degrees centigrade unless otherwise specified.

EXAMPLE 1—preparation of the Copolymers 2.5 mol (740 g) of a $C_{20}$ olefin (made by Gulf) and 2.5 mol (245 g) maleic anhydride were mixed with 200 g xylene as a solvent. The reaction mixture in the reaction vessel was flushed with nitrogen and brought to the reaction temperature of 120° to 170° C. In about 13 batches of 1.7 ml each, tert. butyl peroxide was added at intervals of 30 minutes. About 30 min. after the last addition, the reaction mixture was cooled to room temperature. (Copolymerization can also be carried out in such a way, that the maleic anhydride is added in batches, together with appropriate batches of t-butyl peroxide). Based on the maleic anhydride used, conversion always amounted to more than 95%. Esterification was carried out immediately with the resulting reaction solution, by adding appropriate quantities of the alcohol in question, heating for approximately half an hour, and distilling off of the solvent and excess alcohol. In esterification, reactions with high-boiling alcohols it has been found expedient, especially if the molar ratio of alcohol: maleic acid is to be greater than 1, to remove the water of reaction by passing carbon dioxide through the alcohol-copolymer melt.

The molecular weight of the copolymers was determined with the aid if a gel permeation chromatographic method. This involves a method of high-pressure chromatography, GPC-method, in which a mixture is broken down in keeping with the molecular weight. A correlation exists between retention time and molecular weight, so that the molecular weight can be determined with the aid of calibrating substances. Tetrahydrofuran was used as the mobile phase, and a differential refractometer served as the detector. The column was a microstyragel column from Waters Associates, described in their company publication AN 143, of June 1974.

EXAMPLE 2—Use of the Copolymer a as Lubricant 100 parts suspension polymerized polyvinyl chloride (k value 70) and 1 part octyl tin sulfide stabilizer were premixed for 1 minute with 0.15 parts of the lubricant pursuant to the invention (for details cf. Table 1) in a high-speed laboratory mixer. The mixture is plasticized for about 10 min. at 180° C. on laboratory roller mill with a roll diameter of 110×225 mm and a gap width of 0.8 to 1 mm, revolving at about 20 rpm, whereupon the time was determined which, when rolling at 180° C. was continued, was required to reach a breakdown in sliding ability (adhesion to the rollers) and/or a breakdown in stability (brown discoloration of the film when the degradation point is reached).

A PVC-lubricant mixture which, instead of the 0.15 parts of lubricant pursuant to the invention, contained a heretofore customary lubricant mixture of 0.5 parts tridecyl stearate, adhered to the rollers after 39 minutes, when the same conditions were employed.

long-chained fatty acids with 0.15 parts polyethylene wax.

Whereas, with the commercial lubricant, even in the presence of polyethylene wax, the PVC mixture adheres to the roller after 65 minutes, there is no adhesion with the lubricant pursuant to the invention, although a discoloration occurs after 90 minutes. The mechanical characteristics of the PVC mixture are better with the lubricant pursuant to the invention. Thus, for example, testing according to Vicat (V.S.P/a, DIN 53 460) results in 82° C., vs. 80° C. with the comparison specimen.

What is claimed is:

1. A moldable thermoplastic composition comprising:
   (a) A thermoplastic mold formable plastic, and
   (b) A minor shaping processing improving amount of an esterified olefin-maleic anhydride copolymer comprising a copolymer of an olefin containing 2 to about 24 carbon atoms and maleic anhydride, esterified with a monoualent alcohol containing 2 to about 20 carbon atoms, in a molar ratio of maleic anhydride to alcohol of from about 1:0.5 to about 1:2.

2. The composition, as in claim 1, wherein the alcohol is a branch chain alcohol.

3. The composition, as in claim 1, wherein the olefin contains about 8 to about 24 carbon atoms.

4. A composition as in claim 1, wherein the minor amount is between about 0.05 to about 0.5% by weight based on the weight of the plastic.

5. The composition, as in claims 1, 2, 3 or 4, wherein the copolymer prior to esterification has an average molecular weight of between about 2,000 and about 60,000.

6. The composition, as in claim 5, wherein the copolymer prior to esterification has an average molecular weight of between about 2,000 to about 15,000.

7. The composition, as in claim 6, wherein the molar ratio of maleic anhydride to alcohol is about 1:0.85 to about 1:2.0.

8. The composition as in claim 5, wherein the copolymer comprises maleic anhydride and olefins in a molar ratio of about 0.8:1 to about 1.8:1.

TABLE I

| Esterification With | Molar ratio maleic acid to alcohol | Acid Number | Olefin | Mol. Weight of unesterified Copolymer | Decline in stability in minutes | Minutes to adhesion on rollers |
|---|---|---|---|---|---|---|
| ethanol | 1:1 | 128,0 | $C_{20}$ | 3000 | 130 | does not adhere |
| 2-propanol | 1:1 | 189,7 | $C_{10}$ | 7-8000 | — | 39 |
| 2-propanol | 1:0,9 | 191,8 | $C_{12}$ | 6-8000 | — | 39 |
| n-butanol | 1:1,7 | 35,0 | $C_{20}$ | 10-12000 | 100 | does not adhere |
| n-butanol | 1:0,95 | 124,9 | $C_{20}$ | 10-12000 | 110 | does not adhere |
| 2-ethylhexanol | 1:1,9 | 15,6 | $C_{10}$ | 7-8000 | 130 | does not adhere |
| 2-ethylhexanol | 1:0,93 | 162.4 | $C_{10}$ | 7-8000 | 120 | does not adhere |
| 2-ethylhexanol | 1:0,8 | 171,8 | $C_{12}$ | 6-8000 | — | 70 |
| 2-ethylhexanol | 1:1,9 | 12,3 | $C_{12}$ | 6-7000 | 140 | does not adhere |
| 2-ethylhexanol | 1:2 | 3,6 | $C_{20}$ | 10-12000 | 100 | does not adhere |
| 2-ethylhexanol | 1:1,95 | 7,5 | $C_{20}$ | 10-12000 | 140 | does not adhere |
| 2-ethylhexanol | 1:1,6 | 50,2 | $C_{20}$ | 5-6000 | 130 | does not adhere |
| 2-ethylhexanol | 1:1,05 | 101,5 | $C_{20}$ | 10-12000 | 130 | does not adhere |
| Alfol $C_8$ | 1:2 | 2,0 | $C_{20}$ | 10-12000 | 90 | does not adhere |
| Alfol $C_8$ | 1:1,1 | 97,1 | $C_{20}$ | 10-12000 | 100 | does not adhere |
| Alfol $C_{12}$ | 1:1,9 | 5,9 | $C_{20}$ | 10-12000 | 90 | does not adhere |
| Alfol $C_{12}$ | 1:1,15 | 81,7 | $C_{20}$ | 10-12000 | 100 | does not adhere |
| Alfol $C_{16}$ | 1:1,9 | 7,8 | $C_{20}$ | 10-12000 | 100 | does not adhere |
| Alfol $C_{16}$ tallow alcohol | 1:1,15 | 74,6 | $C_{20}$ | 10-12000 | 110 | does not adhere |
| $C_{16}$-$C_{18}$ | 1:1,95 | 4,7 | $C_{20}$ | 10-12000 | 70 | does not adhere |
| $C_{16}$-$C_{18}$ | 1:1,3 | 62,2 | $C_{20}$ | 10-12000 | 110 | does not adhere |
| $C_{16}$-$C_{18}$ | 1:0,80 | 102,2 | $C_{20}$ | 10-12000 | 110 | does not adhere |

EXAMPLE 3

100.1 parts mass polymerized polyvinyl chloride (K value 57), 1 part tin sulfide stabilizer, 1.50 parts a polyacrylate (MW 26,000 to 50,000) as flow promoter and 0.15 parts of butyl half-ester of a maleic-$C_{20}$-olefin copolymer with an acid number of 124.9 (see Table) pursuant to the invention were tested as in Example 2. For purposes of a comparison, the lubricant pursuant to the invention was replaced in another mixture by 1 part commerically available lubricant consisting of esters of 9. The composition as in claims 1, 2, 3 or 4, wherein the esterified olefin-maleic anhydride copolymer is employed in combination with at least one of the groups consisting of aliphatic hydrocarbons containing more than 12 carbon atoms, aromatic hydrocarbons, esters of fatty acids containing more than 7 carbon atoms, wax esters, wax alcohols or fatty alcohols containing more than seven carbon atoms.

10. The composition as in claim 9, wherein the esterified copolymer comprises 10% to 90% of the combination.

11. The composition as in claims 1, 2, 3 or 4, wherein the thermoplastic polymer is a vinyl resin, a polyolefin, a polyvinylidene chloride copolymer, polystyrene, a copolymer of styrene with acrylonitrile or methyl methacrylate, a polycarbonate, a nylon, an acrylic polymer, an ABS polymer, or a polyester.

12. The composition as in claims 1, 2, 3 or 4, wherein the plastic is polyvinylchloride.

13. In a method of shaping a thermoplastic mold formable polymer using heat and pressure the improvement comprising admixing the thermoplastic polymer with a minor shaping processing improving amount of an esterified olefin-maleic anhydride copolymer comprising a copolymer of an olefin containing 2 to about 24 carbon atoms and maleic anhydride, esterified with a monomualent alcohol containing 2 to about 20 carbon atoms, in a molar ratio of maleic anhydride to alcohol of from about 1:0.5 to about 1:2.

14. The method, as in claim 13, wherein the olefin contains about 8 to about 24 carbon atoms and wherein the copolymer prior to esterification has an average molecular weight of between about 2,000 and about 60,000.

15. The method, as in claim 14, wherein the molar ratio of maleic anhydride to alcohol is about 1:0.85 to about 1:2.0.

16. The method, as in claims 13, 14 or 15, wherein the thermoplastic polymer is a vinyl resin, a polyolefin, a polyvinylidene chloride copolymer, polystyrene, a copolymer of styrene with acrylonitrile or methyl methacrylate, a polycarbonate, a nylon, an acrylic polymer, an ABS polymer, or a polyester.

17. The method as, in claims 13, 14 or 15, wherein the thermoplastic resin is polyvinylchloride.

18. The method as in claims 13, 14 or 15, wherein the esterified olefin-maleic anhydride copolymer is employed in combination with at least one of the groups consisting of aliphatic hydrocarbons containing more than 12 carbon atoms, aromatic hydrocarbons, esters of fatty acids containing more than 7 carbon atoms, wax esters, wax alcohols or fatty alcohols containing more than seven carbon atoms.

* * * * *

UNITED STATES PATENT AND TRADEMARK OFFICE
CERTIFICATE OF CORRECTION

PATENT NO. : 4,192,930

DATED : March 11, 1980

INVENTOR(S) : Heinz Beck, Karl H. Frassek, Werner Holtvoight and Ambar Mukerjee

It is certified that error appears in the above-identified patent and that said Letters Patent are hereby corrected as shown below:

Claim 1, line 7, "monoualent" should read --monovalent--.

Claim 13, line 8, "monoualent" should read --monovalent--.

Signed and Sealed this

Seventeenth Day of June 1980

[SEAL]

Attest:

SIDNEY A. DIAMOND

Attesting Officer

Commissioner of Patents and Trademarks